May 1, 1945.  E. V. RIPPINGILLE  2,374,833
PROPELLER CONSTRUCTION
Filed May 22, 1939  7 Sheets-Sheet 1

Inventor
Edward V. Rippingille
By Blackmore, Spencer & Flint
Attorneys

May 1, 1945. E. V. RIPPINGILLE 2,374,833
PROPELLER CONSTRUCTION
Filed May 22, 1939 7 Sheets-Sheet 3
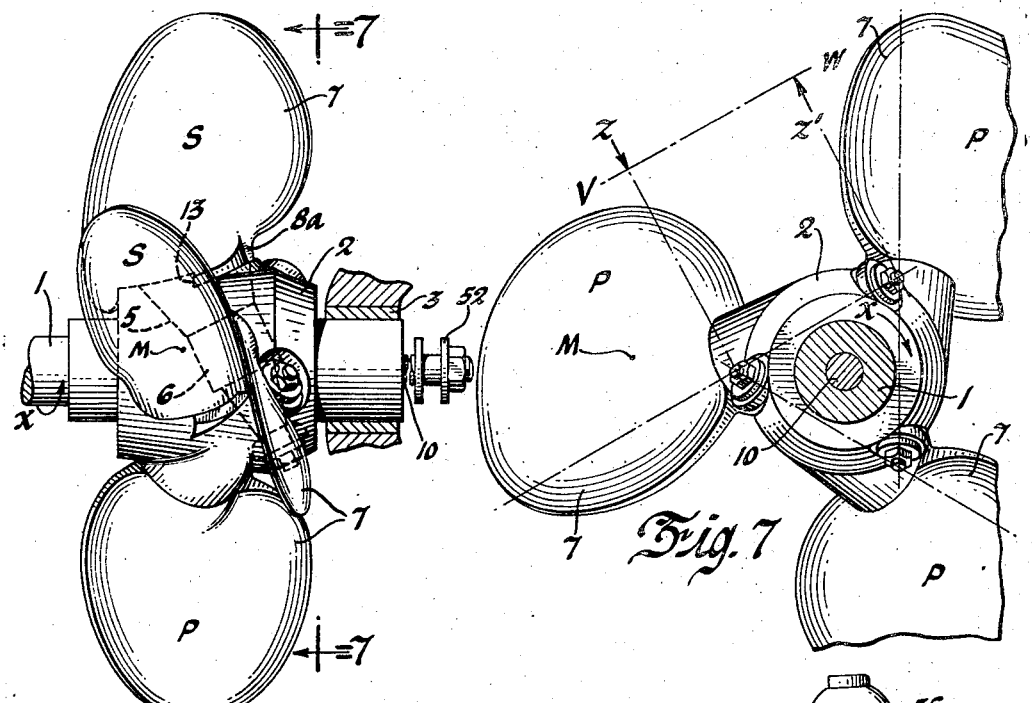
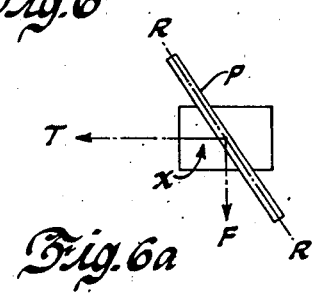
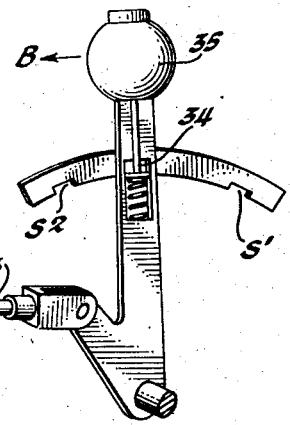
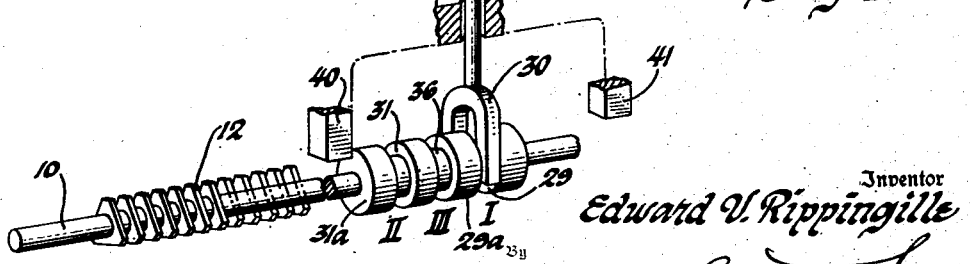
Inventor
Edward V. Rippingille
By
Blackmore, Spencer & Flint
Attorneys May 1, 1945. E. V. RIPPINGILLE 2,374,833
PROPELLER CONSTRUCTION
Filed May 22, 1939 7 Sheets-Sheet 4

Inventor
Edward V. Rippingille
By
Blackmore, Spencer & Flint
Attorneys

Inventor
Edward V. Rippingille
By
Attorneys

May 1, 1945.  E. V. RIPPINGILLE  2,374,833
PROPELLER CONSTRUCTION
Filed May 22, 1939   7 Sheets-Sheet 6

Inventor
Edward V. Rippingille
Attorneys

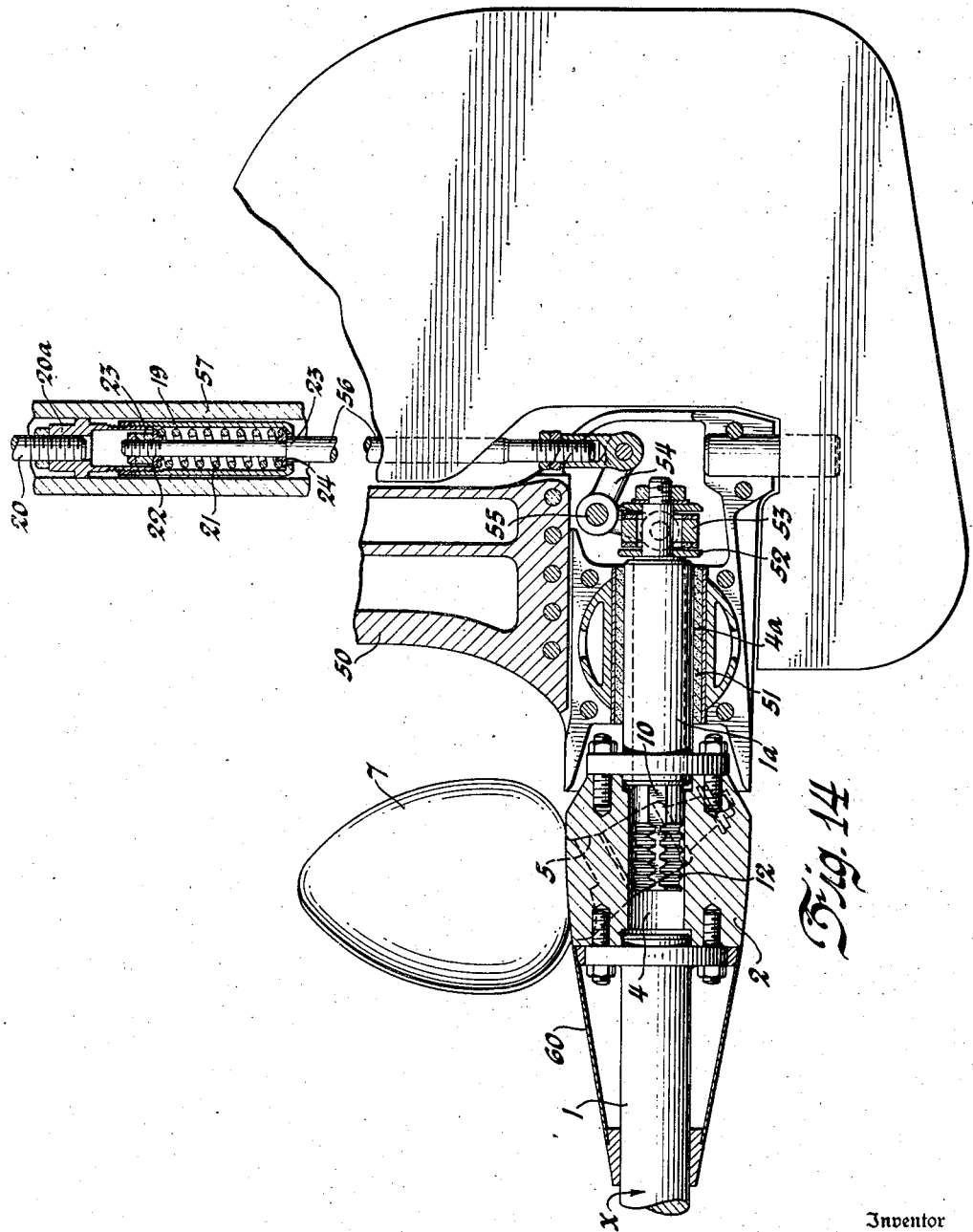

Patented May 1, 1945

2,374,833

UNITED STATES PATENT OFFICE 2,374,833

PROPELLER CONSTRUCTION

Edward V. Rippingille, Detroit, Mich., assignor to General Motors Corporation, Detroit, Mich., a corporation of Delaware Application May 22, 1939, Serial No. 274,883

21 Claims. (Cl. 170—163)

The invention relates to improvements in the mounting and construction of fans or propellers, and more particularly to an improved mechanism for controllable pitch blades in propeller devices for self-propelled vessels and for moving columns of air or liquid providing cooling or other useful physical effects.

An object of the present invention is the provision of a multiple blade construction arranged in the hub of a propeller power shaft so that the hub bearings for the blade shafts are located for maximum support against coupled loads.

A further object of the invention is the provision of a hub of relatively small diameter for low slip stream losses and high efficiency, in which the blade spindles are offset and inclined with respect to the hub axis and inclined with respect to planes perpendicular to the hub axis, so that a nesting and overlapping of the blade spindles is obtained for achieving maximum strength of the mounting within a minimum size of hub structure.

One of the objects is the provision of the inclined blade shaft structure in a hub bearing arrangement according to the first-mentioned object.

An additional object is the provision of a control for rocking the multiple propeller blades on their inclined spindle axes, the said control occupying a central interstitial space with respect to the multiple blade spindles without mechanical interference, and connected to shift all of the offset and inclined blades by rotating contact with elements of the blade spindles through equal pitch angles simultaneously for forward and reverse pitch changes.

Yet another object is the provision of unique bearing support means for the rocking blade spindles, so that thrust and centrifugal force developed by the rotating masses of the blades may be utilized, either to unload the blade spindle bearings, or to load them against turning of the blades at high propeller hub speeds, according to the desired utilities of the force.

An important object of the invention is the provision of means to equilibrate thrust and centrifugal force effects on the blades of the controllable pitch propellers such as described in th above objects, so that a minimum of external force is required to shift the propeller blades to desired variable pitch positions.

It is an object of the invention to provide in the structures described above means for regulating the rate of shift of the controllable pitch blades, and for cushioning the control mechanism therefor against shock during the periods of change of pitch.

A further object is the provision of a controllable pitch propeller device having blades with both forward and reverse working faces, and in which device the blade mounting construction affords greatest strength and resistance to bearing loads while permitting a hub contour of proper slip-stream efficiency.

An additional object is the provision of control means for the controllable pitch blades of the invention, which enable the operator to lock the blades in the desired forward or reverse pitch positions or in the neutral position; a supplementary object being a control which enables the operator to prevent reversal of pitch between forward and reverse positions, unless the operator deliberately select such operation.

It is a general object of the invention to provide a structure in this art which is readily adaptable to reversible and variable pitch propellers, for automatic or self-adjusting control effects.

The particular features enumerated in the above objects, and described in the following specification constitute the invention, which may here be briefly summarized as consisting in certain novel combinations and arrangements of parts which shall be described herein, and set forth in the appended claims.

In presenting the present subject matter, the applicant has preferred to limit any mathematical or geometrical references herein to a minimum, so as to render the invention easier to understand. This has been prompted by the fact that the use of inclined blades and spindles with inclined spindle bores is relatively new in this art. Because three-dimensional geometry is involved, always difficult to perceive in two dimensional views, it was felt that a primary disclosure of the nesting of the inclined spindles of the inclined blades would be sufficient teaching for the designer to grasp the principles and apply them.

Since the effects of centrifugal and thrust forces are known, the designer having the applicant's teaching may exercise considerable latitude in correlating these forces to obtain cancellation or adding of them, as his needs require. Once given the principle of detaching the vector of blade mass from the median line, the limits of needed pitch and the corresponding variations in the components with speed of vessel and propeller lie within a usable range and are flexible for adaptation to special forms of blades embodying acceptable reverse pitch efficiency.

In the drawings, the Figures from 1 to 5 describe one general propeller arrangement according to the invention, and Figures 6 to 12 describe a second arrangement. Figure 13 describes a method of assembly of moving parts common to both arrangements. Figure 14 shows an example of the invention as for a water-borne ship, according to the second general arrangement. Figures 15, 16 and 17 relate to controls adaptable to both general arrangements.

Figure 5b is a schematic diagram according to Figure 5, resembling Figure 3a.

Figures 1, 2:
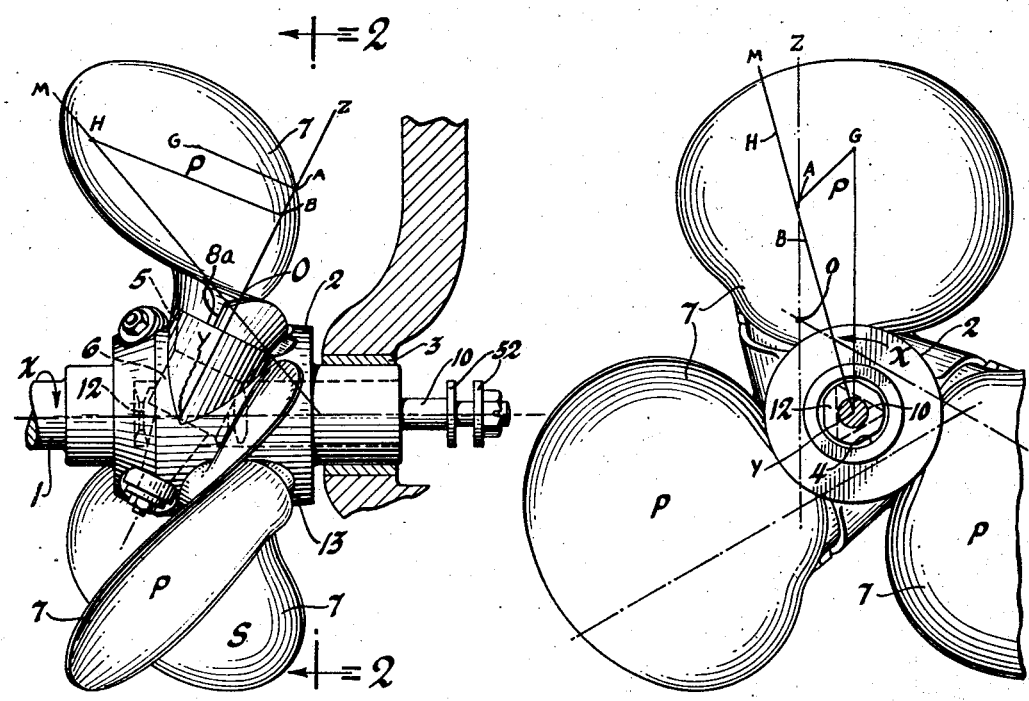
Figure 1 is a longitudinal elevation drawing of a composite propeller according to the invention, showing the general blade mounting arrangement.
Figure 2 is a transverse elevation view of the hub of the propeller of Figure 1 taken at 2—2.
Figure 8:
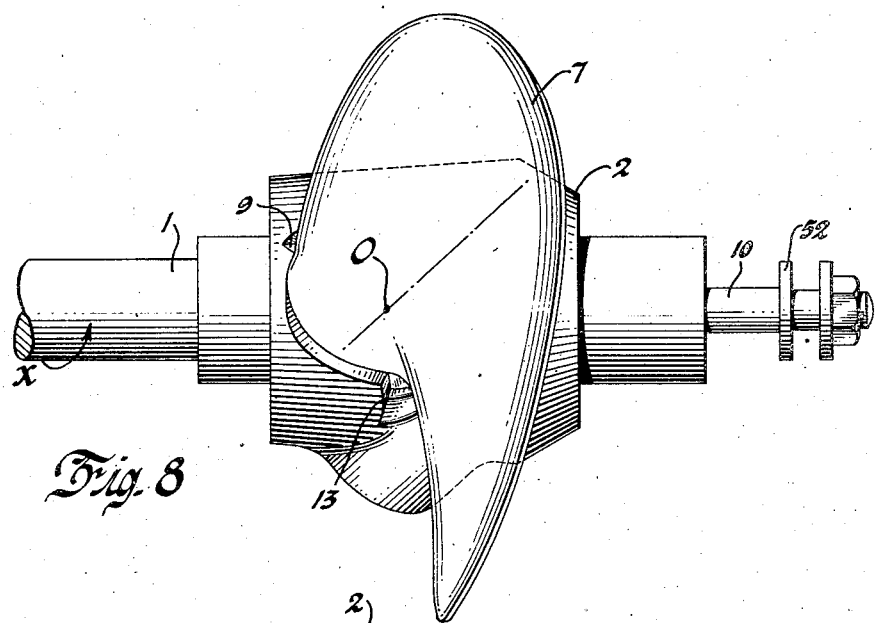
Figure 9:
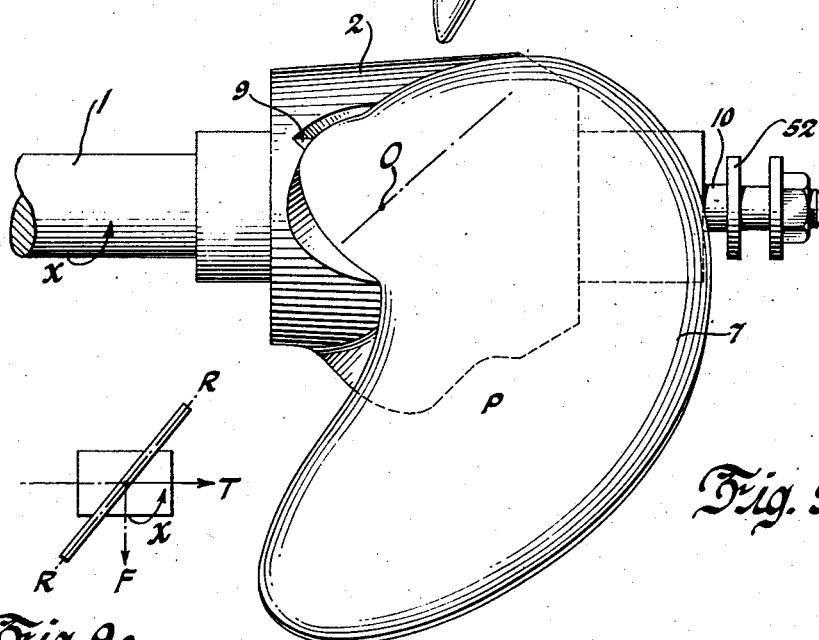
Figure 9A:
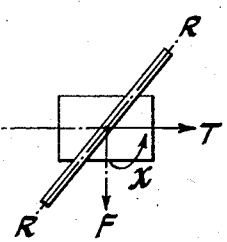

Figure 6 is a view of a second arrangement of the invention, similar to that of Figure 1, but with the blade spindles inclined oppositely to the first arrangement of Figures 1 to 5 inclusive. Figures 7, 8 and 9 correspond to the Figures 2, 4 and 5 respectively, illustrating the second arrangement. Figure 6a is a similar view to that of Figure 3a for the second arrangement, and Figure 9a is similar to Figure 5b.

Figure 10:
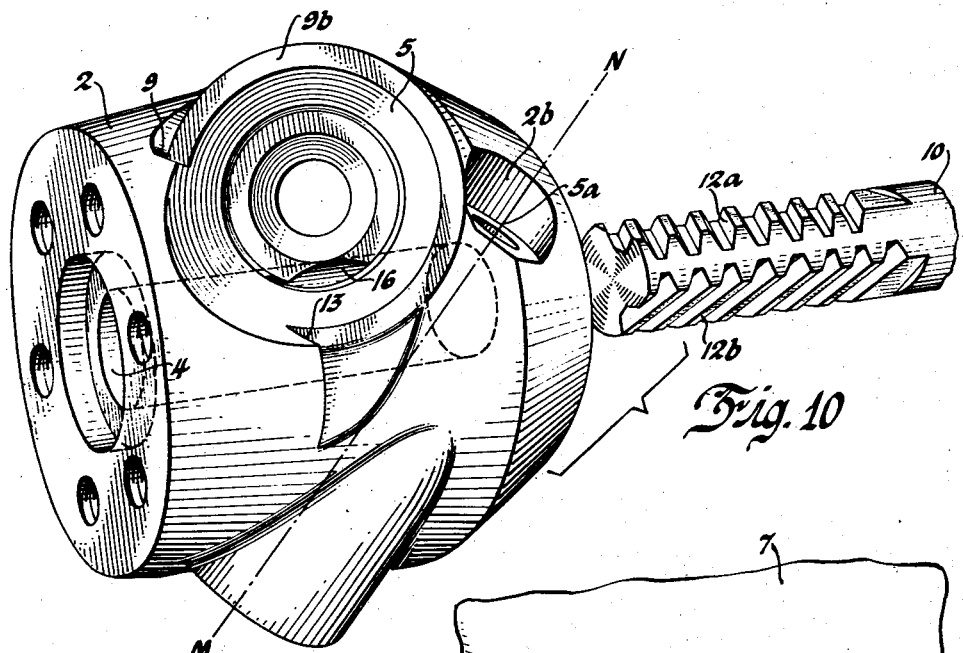
Figure 11:
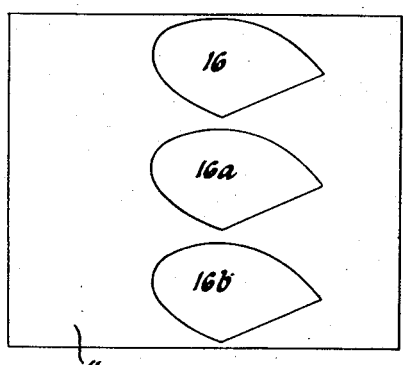

Figure 10 is a perspective view of the hub of Figures 6, 7, 8, and 9, of the second arrangement, with the blade removed from its bearing bore, the eye of the observer looking directly into the bore. The figure shows the blade spindle operating rod removed from the bore to illustrate the construction of the rack of the control rod. Figure 11 shows the development of the central bore of the hub of Figure 10, to show the method of close fitting of the rack to the blade spindle teeth through apertures between the central and the inclined blade spindle bores.

Figure 12:
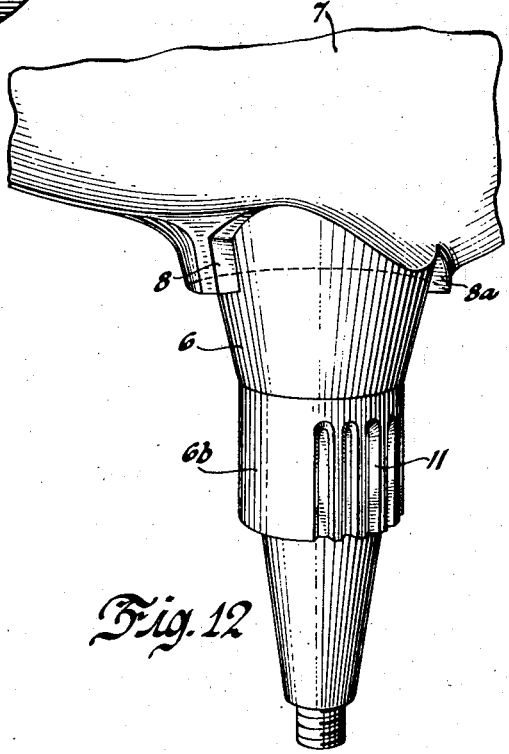

Figure 12 is an elevation view in part of the blade of Figures 8 and 9, the blade fitting the full-view bore of Figure 10. Figure 12 illustrates the blade stops and the blade spindle construction which cooperates with the bore and the rack of Figure 10.

Figure 13:
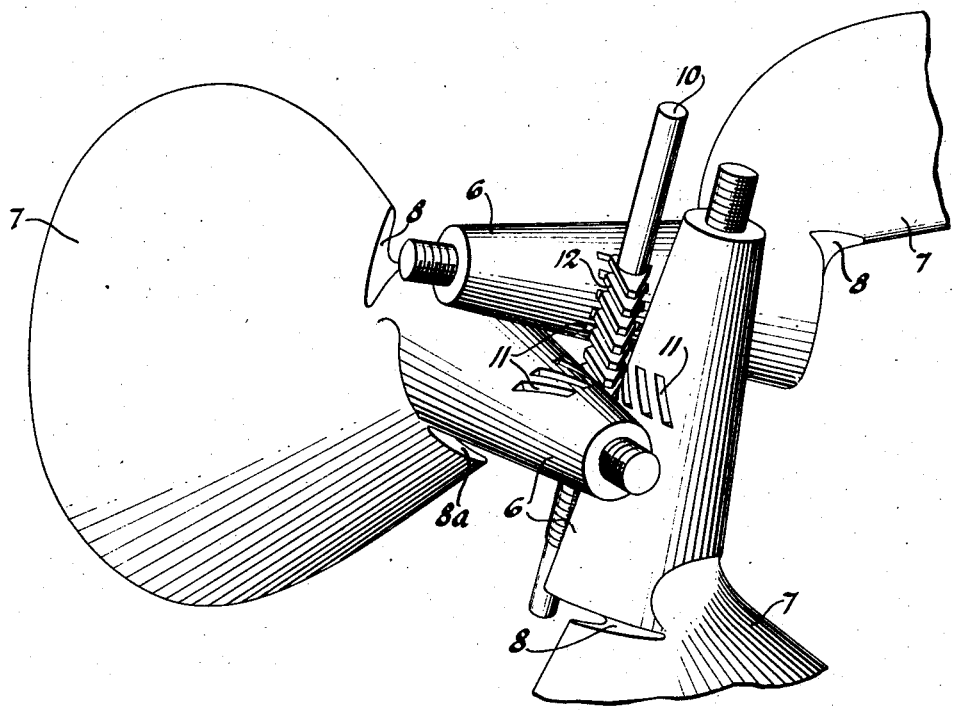

Figure 13 is a schematic model view showing in perspective the assembly of overlapping blade spindles according to the invention, and illustrating the nesting of the blade spindles and rack within the hub body.

Figure 14 is a section elevation view of a form of the invention as installed in a ship, describing the blade rocking and controlling mechanism, with provision against shock loading.

Figure 15:
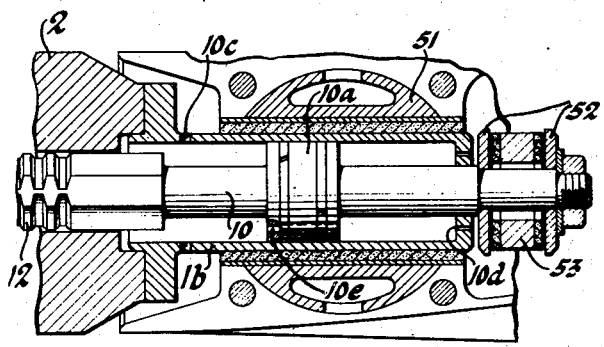

Figure 15 shows a modification of the mounting and shock absorption means of Figure 14, wherein a dashpot limits the rate of rocking movement of the blades.

Figure 16 is a schematic control in perspective for operator manipulation for shift of pitch between forward and reverse, with stop means for holding the blades in the limiting positions and in the no-drive or neutral position.

Figure 17:
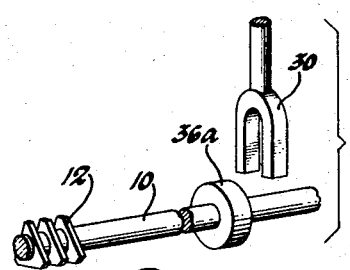

Figure 17 is a schematic view of a supplementary control following the pattern of Figure 16, but for a different control purpose.

In Figure 1 the shaft 1 as a propeller shaft is affixed to hub member 2, and rotates the hub, delivering all torque thereto in the direction of arrow X. The hub member 2 may be supported on a bearing such as indicated at 3, to absorb torsional loads, and to stiffen the drive to the propeller blades.

The hub is bored axially to accommodate a blade rocking control rod 10, and is taper bored at 5, as indicated in Figure 1 by dashed lines, to accommodate the stub ends or spindles 6 of the blades 7, in the present demonstration, three in number. The centerlines of the bores 5 are rotationally and symmetrically inclined with respect to each other and offset with respect to the hub centerline of rotation, with the bores extending through the body of the hub so that a full bearing for each blade 7 is provided by the hub structure as indicated in Figure 2 and subsequent figures. The specific blade mounting method is illustrated in detail in Figures 10 and 12. In Figure 1 the external contour of the hub 2 is shown as tapered. In practice, the hub shapes allowable are ogival, or otherwise contoured with respect to the hub centerline for maximum slipstream efficiency such as in the example of Figure 14.

Figures 3, 3A:
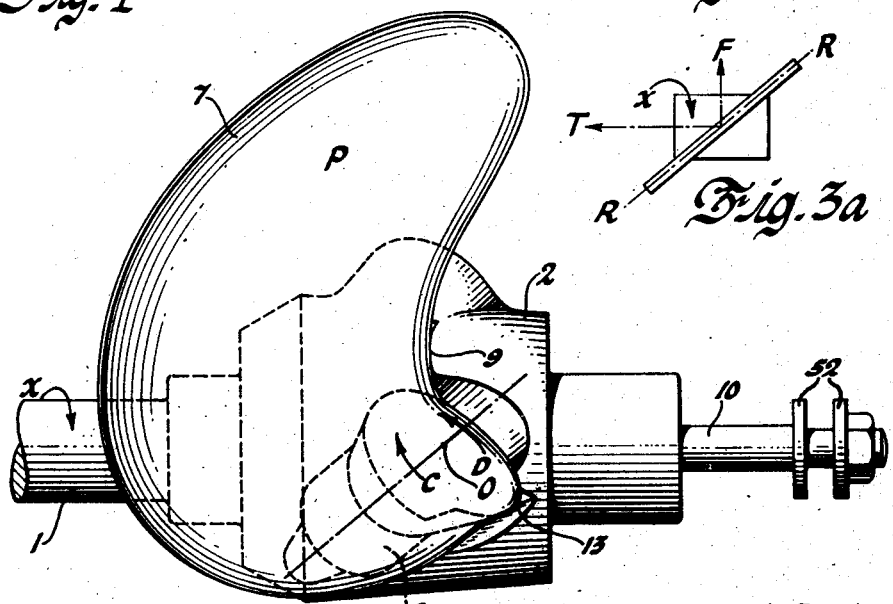
Figure 3 is an enlarged elevation view of the hub and one of the blades of the structure of Figures 1 and 2, the blade being shown in forward pitch.
Figure 3a is a schematic diagram illustrating the simple thrust and torque forces acting on the blade of Figure 3.

The blades 7 are mounted with their tapered spindles 6 in the hub bores 5, and it will be seen that if the normal rotation of the propeller shaft is as the arrow X indicates in Figures 1 to 5 inclusive, the resultant thrust obtained is indicated by arrow marked T in Figure 3a the helix inclination of the blades is as a left-handed screw thread.

Figure 4:
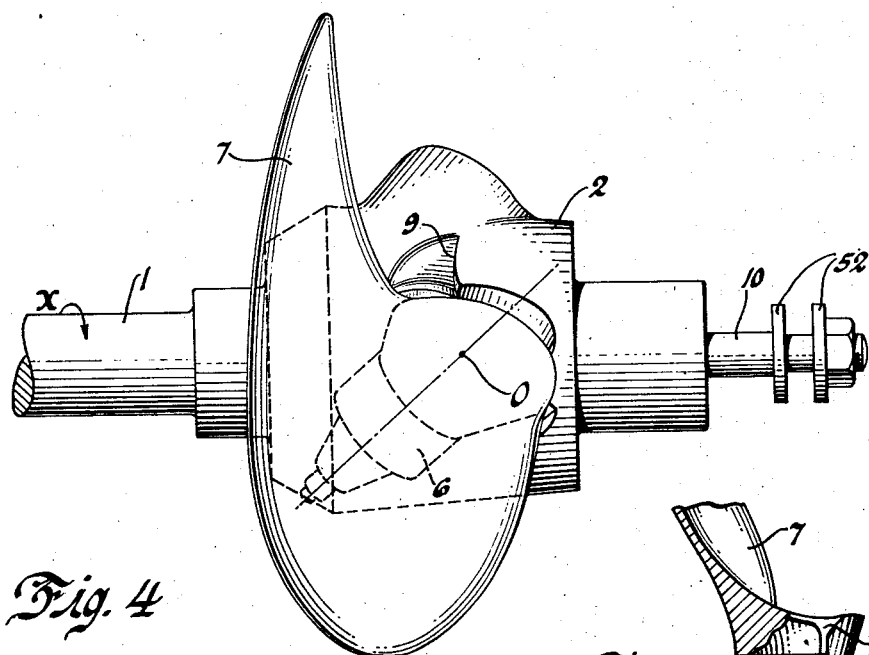
Figure 4 is a view similar to that of Figure 3, but with the blade shown in approximate zero pitch.
Figure 5A:
Figure 5a is a part section of the blade of Figures 3, 4 or 5, illustrating the stop mechanism and also the use of blade spindle rocking teeth of inclined pitch.
Figure 5:
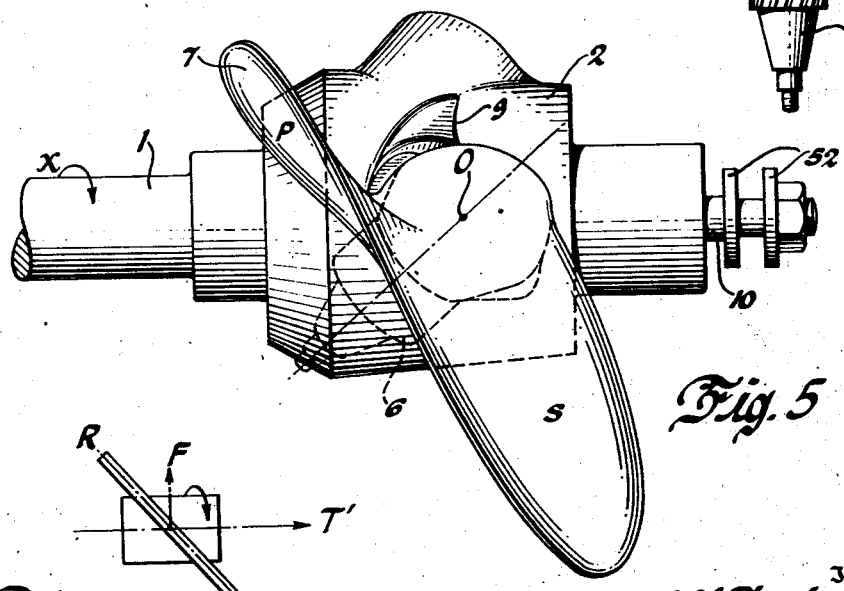
Figure 5 is a view similar to those of Figures 3 and 4 but with the blade shown in reverse pitch.

In Figures 3, 4 and 5, only the nearest blade of the three is shown for clearer primary understanding of the actions taking place between the thrust and the load. The blade 7 of Figure 3 is shown with its spindle centerline intersecting the plane joining the eye of the observer with the shaft centerline at the point O where the spindle 6 emerges from the hub 2.

For clearer understanding of the action of the thrust and centrifugal forces, the spindle axis is extended at O—A—Z for the uppermost blade in Figs. 1 and 2. The median line of the blade extends from the main axis center at Y, through points H—M. The thrust moment arm couple is indicated at H—B, and the mass moment arm at A—G. These rotative couples oppose each other.

The line OZ in Fig. 2 is the extension of the spindle axis. The line Y—G is the vector representing the component of mass of the blade. The line A—G is the rotative moment arm through which G exerts a centrifugal pitch-shifting couple. The line Y—M represents a line of force in which the center of thrust may lie at H for a given pitch setting, the arm H—B representing the moment arm applying an opposing rotative thrust couple upon the spindle axis O—Z.

The actual mass values and the thrust values are, of course multiplied by the length of their arms in order to calculate the net forces opposing. Since centrifugal force along Y—G rises with speed, the speed-times-mass factor is a variable one, and since the blade is moved angularly about its inclined spindle at a second degree of angularity, the distance of point G from Y will vary with pitch settings.

The median line M—Y of the working face passes through the effective center of area of the blade and through the center of rotation Y of the propeller. It may be inclined forward as shown in Figs. 1 to 5 or astern or shown in Figs. 6 to 9. It approximately bisects the effective working area of the blade.

For understanding of the principles, one should examine the topmost blade 7 in Figure 1, which shows the working face marked P located at a distance to the left of point O where the spindle centerline emerges from the body of the spindle. The face is offset and at an angle therefrom by a given distance, and angularity for imparting a rotational couple to the blade, to be discussed in detail later. The principle of the offset and inclined blade in combination with the inclined spindle is believed novel in the combinations herein shown, disclosed and claimed.

The inclination of the blade spindles 6 away from the direction of the thrust force T may cause tightening of the blade spindles in their bearings in hub 2; whereas, as will be discussed later in connection with Figures 6 to 10 inclusive, inclination of the blade spindles in the opposite direction may tend to loosen the spindles 6 in their bearings in hub 2. In both cases, the load on the bearings is a combination of the thrust and centrifugal force effect; the first being opposing, the second additive.

Figures 1 and 2 are two views of the same structure, the blades 7 being set in forward pitch. Figure 3 shows a more detailed view of one of the blades in forward pitch, and Figures 4 and 5 describe the setting of the blades for neutral pitch and reverse pitch respectively. The designations P and S are used to show clearly which portions of the blades are the pressure and suction faces under the particular pitch conditions illustrated in the drawings.

With the force being applied as noted, and the resistance overcome as indicated by line R—R of Figure 3a, it will be understood that the reaction of thrust on the body and stub 6 of any one of the blades 7 in the illustration of Figures 1 and 3 tends to tighten the spindle 6 in the bore 5 of the hub 2 while centrifugal force would tend to oppose this action. There is also a twisting or rotary component applied to blade 7, as indicated by curved arrow C in Figure 3, because of the resistance of the water, air or other media in which the propeller is to work, and of the helix angle of the blade and a counterclockwise rotative couple opposing. The lugs or stops 8 of the blades 7 are arranged to abut the forward stops 9 of the hub 2 at a position for maximum propeller efficiency, when engine torque in the direction X is applied. This exact construction of the stops is clearly shown in Figures 10 and 12. The reaction of the forces in the present example tends to unload the tapered spindles 6 in bores 5 when overtaking torque occurs. These forces are, however, not thrust acting alone, but are to be considered also with the effect of centrifugal force on the blades, when determining the total effects of these forces on the bearings of spindles 6 in hub 2 and the rotational couple about the blade spindle.

Centrifugal force on blades 7 assists in the unloading of the tapered bearing between spindles 6 and hub seats 5, permitted by the fact that the taper is outward-flaring from the shaft center, as illustrated in Figure 12.

The designer is therefore given considerable scope in correlating these forces such that in forward driving of a ship's propeller, for example, the thrust components and speed effect can be arranged to counteract each other as described to afford a reduction in the net loading effect on the spindle-to-hub bearings and the shifter mechanism, as well as the limit stops. On the other hand, by inclining the blade spindle bearing bores 5 as in Figures 6 to 10, or oppositely to that of Figures 1 to 5, the tendency is for thrust on the blades to unload the bearings of the blade spindles, which effect is augmented by centrifugal force on the blades. This arrangement is described in detail in connection with Figures 6 to 10.

Since it is useful that certain forms of blade pitch control be relatively free to shift the blades under varying thrust and speed conditions, the unloading form of construction is preferred herewith. It is within the scope of the invention, however, for the mechanism to be arranged so that the blade spindle bearings tend to be sufficiently thrust loaded at all times to prevent undesirable oscillations of the blades through varying pitch angles during transitional periods of unevenly applied thrust and centrifugal force, in order to avoid excess jockeying of the control, or of the equalizer mechanism of the rack 12 and spindle teeth 11, as will be apparent later.

The Figure 2 section taken at 2—2 of Figure 1 illustrates the overlap of the blade spindle centerlines and ends with respect to each other in the axial dimension. This provides maximum blade support by the hub on a long arm, in a minimum of hub space, yielding higher efficiency, since the smaller hub has less resistance to flow for the media in which immersed.

Attention is directed to the adaptability of the hub structure of the invention to self actuation for automatic coasting. The present description is primarily concerned with the arrangement of parts and the construction of the hub for use in propeller or fan installations wherein it is desirable to shift the blades selectively through varying pitch angles, both positive and negative. In the following descriptions of the functioning of the device, reference is made in pertinent passages to automatic feathering effect in order to disclose the operation features clearly. The present specification, however, does not claim the blade self-adjusting features per se, except in the combinations involving the relationships of the structure in this disclosure, those further features being reserved for a subsequent application. The blade spindles of the construction of Figures 1 to 5 inclusive are inclined such that the point of attachment of the blade root is toward the rear of the hub, which principle will be described here by the term "aft" rake. Figure 5a shows a method of forming the blade spindle, and shows the blade face axis inclined to the spindle axis.

Figures 6 to 10 inclusive are especially shown to describe an alternate construction to that of Figures 1 to 5, in which the relationship between normal blade center of pressure, offset angle of the blade spindles and taper of the blade spindles is such that under forward torque, the reaction thrust tends to unload the tapered bearing between spindles 6 and the hub seats, assisted by centrifugal force. In these figures the blade spindles may be described as having "forward" rake.

It is useful to observe that rake of the blade, as distinct to that of the spindle axis, may be referred to the median line X—H—M of Figs. 1 and 2.

When the engines are decelerated to idling, the transfer of thrust from the working faces P of the blades to the opposite sides S may put a rotatory couple on the blades tending to rock them toward some null point, when the blade center of pressure is offset with respect to the blade spindle axis and from the mass center as in the present invention. In either version, the tapered bearings tend to be unloaded by centrifugal force, but in the first case described in connection with Figures 1 to 5, the overtaking torque couple exerts a thrust force working with the centrifugal force, and in the second case it works against or centripetally. In both cases, the blades may tend to rotate automatically toward some null point with overtaking torque. It should be remembered that unless the power plant drive to the shaft 1 be absolutely stopped, or declutched, the driving engines will have a given idling rotation, the effect of which when opposed to a reactive couple on the blades, may cause the blades to assume a retarded pitch position not at null or zero pitch, but at some forward helix angle where the slipstream and the propeller shaft forces referred to the blade rotational forces will balance. This will be a small or a large angle according to the speed of the propeller shaft, the velocity of the slipstream and the normal offset of the mass of the blade and the blade pressure center with respect to the stub or spindle axis.

Figure 4 shows schematically the blade 7 at zero effective pitch. This is, however, assumed with no way on the vessel for which the propeller is the driving means. At zero pitch, the blade 7 merely churns the media, such as air or water, without imparting a force T to the vessel. Figure 5 shows the blade 7 rotated to reverse pitch position in which the non-working face has become the working face.

It will be readily understood that the inclination in two directions of the blade spindles 6 in the hub 2 and the median line of the face with respect to the main axis is a novel expedient for obtaining maximum bearing support for the blade structures in multiple blade assemblies, and also for providing internally mounted concentric control means. In simple two-blade propellers, this expedient may be of less importance, in that the ratio of hub diameter to overall force requirements may not be critical. In high horsepower installations, however, requiring multiple blade propellers, the problem of obtaining adequate efficiency through small hub diameters, with sufficient strength to support the loads becomes acute. The present invention solves this by overlapping the blade spindle axes in planes intersecting the main axis as shown in Figures 1, 2, 6 and 7. This method is believed unique and of outstanding merit in propulsion mechanisms for water borne vessels, aircraft, or power installations required to move large bodies of air or liquid.

The central bore 4 of the hub 2 of Figure 2 supports sliding rod 10 shiftable by external means through mechanism to be described later. The inclined spindle bores 5 open into the central bore 4 at apertures marked with the numeral 16, as shown in detail in Figure 11 to accommodate pinion segments 11 integral with blade spindles 6, and bore 4 accommodates rod 10 and rack 12 which meshes with the segments 11 of all of the blades.

As the rotational force X is applied to shaft 1, the reaction of the force components on the blades 7 may be exerted to rock them into contact against the forward stops 9; but with overtaking torque such as would obtain when the power to shaft 1 would be shut off or reduced, the motion of the water or other medium past the blades 7 may apply a rotatory force tending to rock them away from the stops 9 toward a null or idle position.

To make this point clear, Figure 3 shows the blade 7 and spindle 6 in bore 5 of hub 2, the arrow X indicating the normal rotation of the hub; the arrow C the rocking couple on the blade spindle, and the arrow D the rotational component applied to the blade 7 and the spindle 6 by the water motion when the rotational force X is diminished. The momentum of the ship or the inertia of motion of the medium against which the propeller works applies a component which may overcome a given low value of torque X, and may provide sufficient force to rock the blade away from the forward stop 9 toward the zero pitch position.

The rod 10 and the rack 12, unless otherwise prevented from yielding to such reactive force, will then follow the rotation of the segments 11 until the blades 7 turn with respect to the centerlines of the spindles 6, arriving at some balancing angle equilibrating slipstream with engine derived forces. The operator's control may then shift the blades until they have passed through the null position of Figure 4 to that of Figure 5 and are set by the controls so that when power be again applied to the shaft to rotate hub 2 in the X direction, the reversal of the blade helix angles may cause the thrust to be applied to the hub in the direction T' of Figure 5b, or reversely to the direction T.

The utility of this reversing of thrust characteristic will be understood when the function of rod 10 and its control of the blades is analysed. If, for example, the construction above described be applied to the drive for a ship, driven by internal combustion power plant, the reduction of the throttle control to idling, with way on the boat, may tend to rock the blades of the composite propeller toward zero pitch. From this point the operator's control for shift to reverse then requires only a small force working through a lessened distance to complete the blade shift to reverse. Reducing the speed of the primary power plant to idling sets up the condition of low forces on the blades, diminishing with the drop in velocity of the vessel or of the water stream.

Assuming that the rod 10 and the rack 12 are controlled so that such a reactive force cannot shift the blades past the idling point or zero pitch unless the operator permits, the blades may then automatically tend to feather between full efficiency driving position, where lugs 8 abut the forward stops 9, and an equilibrating low positive pitch position, following the opening and closing of the speed control for the engines driving shaft 1.

Attention is directed to Figure 17, in conjunction with the external controls of Figures 16 and 14. These external controls are described in detail further in this specification. Figure 17 shows a neutral stop controlled by the operator, for preventing the blades from shifting through neutral pitch position, unless the operator determine to make a change between forward and reverse. It should be noted that in each case the opposition of thrust and centrifugal force leaves only the differential of these forces to be dealt with by the shifter and stops.

It is also within the scope of the invention to cause the rod 10 and rack 12 to be locked by the controls in idling position so that the power plant may start and rotate shaft 1 without propelling the ship, the mechanism furnishing a "no-drive" control similar to that of an automotive main clutch, or by analogy, the null ratio control of an infinitely variable transmission. This makes it possible to warm up an engine or series of engines with the drive gear engaged, while permitting the propeller to idle with no shaft torque other than that of churning drag in the water, with no ship propelling component such as T.

Figure 16 is provided to show a "lock-in" control auxiliary to the control applied to shift rod 10 and rack 12 to forward or reverse pitch positions. The lock-in control is described in detail later on in this specification, and is for the purpose of holding the blades positively in forward, neutral or reverse pitch positions.

Now if the operator release the locking means holding rod 10, rack 12 and blades 7 in idling or zero pitch position, and shifts the control to "forward," the engine speed control need not be immediately advanced, and the interaction of the components described may serve to rotate blades 7 toward forward position against stops 9. To prevent sudden shock the rod 10 may be dash-potted as indicated in Figure 15 so that a predetermined time interval may elapse during which the lugs 8 may advance to full abutment with stops 9. Shock is further avoided by the making of the thrust receiving parts including the shaft 1, of material having a predetermined degree of resiliency. The dashpot device protects the mechanism against quick response to sudden increase in throttle settings.

Figure 6 shows a propeller shaft 1 supported in bearing 3 and attached to hub 2, for propeller blades 7, the blade nearest the eye of the observer being important for the discussion to follow. The blades 7 individually spindled in inclined bores 5 of hub 2, are shown in forward driving position for the direction of rotation of shaft 1 indicated by arrow X.

The axes of the bores 5 for spindles 6 of blades 7 are inclined both with respect to the main shaft centerline and to parallel planes intersecting the main shaft centerline perpendicularly, as explained preceding.

To facilitate understanding of the geometric relationships involved in the hub mechanism, it is useful to conceive of the blade spindle axes as being inclined according to the method of the right and left hand screw thread of the machine arts. The arrangement of Figure 6 shown in part elevation in Figure 7, as far as the blade spindle 6 is concerned, has then a "left-hand" inclination. The principle of inclination of the blade face to the blade spindle axis enables the designer to proportion the developed working surface of the blade for best efficiency while retaining the advantages of blade spindle inclination.

The dashed lines X—A—H—M and X—G indicate the median line and the vector of blade mass, as in Figs. 1 and 2.

Figures 8 and 9 represent the structure of Figures 6 and 7 with the blades set in neutral and reverse pitch respectively.

The blade faces in the figures are marked by the letters P and S, the designation P representing the pressure or working faces, and S the suction faces. In Figure 8, the blades are assumed to be in neutral position, and are therefore non-working on both faces, and are not so lettered. In Figure 9 the face which was in Figure 6 marked S has now become a working face P, having been rotated clockwise through neutral pitch to reverse pitch by means of the pitch control mechanism within and external to the hub, operated from rod 10 and collar 52.

The blade pitch with respect to the direction of rotation of the main shaft determines the direction of thrust. It is possible to show in a small diagram the relationship of force and thrust, therefore I have provided Figures 3a, 5b, 6a and 9a, wherein the central rectangle indicates the propeller hub, the line R—R the center plane of a blade of paddle form, the arrow X indicating the rotation as in the companion Figures, 3, 5, 6 and 9; the line F the force to be overcome, and the line T the direction of thrust applied to the vessel or to the support of the main shaft.

It is obvious that the thrust imparted to the whole is a mechanical component of force and resistance. This is shown in the small diagram of Figure 6a where line F, plane R—R and thrust line T correspond to the general operating conditions of Figure 6. Likewise the small diagram of Figure 9a shows these relationships for the reverse drive of Figure 4. These diagrams are wholly schematic, and merely represent the primary mechanical functions.

A rule worth remembering in the study of boat propellers is that when viewed from astern, the blade pitch, right or left hand, always corresponds with the rotation of the shaft as so viewed, when the drive is forward, or away from the eye of the observer as in Figure 7.

It is clear, then, that blades 7 of Figures 6 and 7 are shown in forward pitch, and in Figure 9 in reverse pitch. This is true because shaft 1 in Figure 7 has right-hand or clockwise rotation and the blades of corresponding Figure 6 are positioned corresponding to a right-hand screw thread.

Now in Figure 9, the shaft rotation when viewed from astern will still be clockwise, or right-handed, but the blade pitch angle has become "left-handed," therefore, drive is in reverse, that is, the suction faces have become the working faces of the blades.

In order to illustrate more precisely the exact construction of the hub, blades, and control rod of the propeller drive mechanism of Figures 6, 7, 8, and 9, the following figures are given:

Figure 10 is a perspective view of the hub 2 drawn so as to carry the eye of the observer directly into the bore 5 for one of the blades 7 such as is shown in Figure 6. The material of the hub 2 forms a shallow stop 9 having a face 9b toward the eye of the observer at right angles to the centerline of the bore 5. Because of the angular relationship between the hub bore 5 and the main centerline of the hub, it will be noted that the face 9b extends around the circumference of the stop 9, except for a section in which it intersects the material of the hub, terminating in two cut-away stops 9 and 13, for cooperating with mating stops 8 and 8a of the blade 7 and spindle 6 of Figure 12.

In the particular construction of Figure 10 provision is made for three blades, although it is deemed necessary to show only two in this view. Centerline M—N inclining downward and to the left is that of the bore 5a similar to bore 5 described above. It will be noted that there are two tapered portions of the blade spindle 6 of Figure 12 cooperating with mating bearing surfaces in bore 5 of Figure 10. The cylindrical boss 6b of the blade spindle 6 of Figure 12 is cut away in a segmental area to form teeth 11, the chord of which area is related to the angular position of stops 8 and 8a about the centerline of the blade spindle 6, so that when the blade is inserted in the bore 5, a zone of limited motion is determined by the intersection of the stops 8 and 8a with the stops 9 and 13 of the hub, in which range of movement the teeth 11 may move through aperture 16 shown at the lower inner portion of bore 5 of Figure 10. Since there are three blades in this construction, Figure 11 is given to indicate the development of the inner surface of central bore 4 coaxial with the centerline of rotation of the hub, the three apertures being shown at 16, 16a, and 16b.

The end of the blade spindle 6 remote from the blade 7 is retained by approximate means such as a nut and thrust collar recessed within the contour of the hub in a space such as indicated at 2b in Figure 10.

Rack rod 10 shown as in position for entering bore 4 of hub 2 has teeth inclined to the axis of rod motion for engaging the teeth 11 of boss 6b of spindle 6, the uppermost rack teeth 12a shown, being for engaging with the teeth of the spindle which is in bore 5. There are, of course, three sets of teeth to control angular movement of all three blades simultaneously.

By comparison of Figures 6, 7, 8 and 9, one will note that when the stop 8 abuts stop 9 of hub 2, the blades are disposed as in Figures 6 and 7 for forward drive. When the blades are rocked so that stop 8a abuts stop 13 of hub 2, the inclination of the blades is as shown in Figure 9 for reverse drive.

Figure 13 shows in perspective the method of grouping the blade spindles 6 with the rack 12 and rack rod 10, in a three-blade propeller. The form of the spindles 6 is somewhat different from that shown in Figure 12, the whole external surface of the spindle being utilized as a bearing, except the segmental toothed areas. It will be noted that here the rack teeth 12 are straight teeth cooperating with inclined teeth 11 of the spindles 6. The offset of the blades from the spindle centers is shown clearly in the upper right-hand portion of the drawings.

The form of the blade spindles shown in all of the figures except Figure 13 is such that a tapered bearing portion is located above and below the toothed segment, as shown clearly in Figure 5a and Figure 12. The form shown in Figure 13 is a modification which operates identical with the first version, but enables the whole structure to be compressed into a smaller space, by virtue of the indented tooth segments being cut into the general taper of the spindle, rather than projecting therefrom. The modification arrangement provides, like the first, a long bearing for the spindle in the hub body bore, the maximum strength to support the torque and centrifugal forces of the blades.

A further consideration is the relationship of the working elements of the blades to the blade spindles. In Figures 6 to 10, the positioning of the blades is at the forward ends of the inclined spindles. Figures 1 to 5 show them at the rearward ends of the spindles, which was described as giving the blade spindles a rearward rake. A reason for attaching them at the forward ends is the obtaining of a greater force-supporting hub structure within the smallest possible volumetric space so that the water resistance caused by the physical size of the hub will be at a minimum.

To understand this feature clearly it is necessary to trace through in the construction the relationships of the thrust loads. Observing the blade nearest the eye in Figure 6, one finds that a bending moment on the face marked P is applied to the blade spindle shaft 6 as a rocking couple indicated by the line v—w shown projected above the corresponding blade in Figure 7, the arrows Z—Z' showing the forces which must be absorbed in the hub to sustain the couple.

The body of the hub is unitary and absorbs or transmits stresses uniformly as in any other homogeneous structure. The point of attachment of the blade 7 to the spindle 6 is supported by a larger bearing than is used at the opposite end of the spindle in order to provide heavier root section and to better distribute the load at the point of greatest stress. This is shown clearly in Figures 10 and 12. When the blade thrust force is directed inward through the larger mass of hub metal at Z to a greater degree than outward at Z' a minimum of bossing projection beyond the normal streamlined contour of the hub is required. If the blades of Figures 6 to 9 be mounted on the opposite ends of their spindles, in forward pitch, the greatest couple or thrust force would be exerted at Z' as bearing load, and unless a heavy shoulder were extended beyond the normal streamline hub contour, the couple would tend to burst the hub. By placing the larger stress supporting elements as shown, the streamline hub contour is best preserved.

This feature of attaching the blade to the spindle so that the resultant greater bending moment is taken by the hub as a compression rather than a tensional force at the point of greatest thrust, is obviously associated with the primary feature of inclination of the blade spindles. These features make it possible with the construction of the invention, to compress the maximum torque-handling capacity of the mechanism into the minimum of volumetric space for the hub.

The feature of the inclination of the blade spindles is also augmented by their extension through a length of bearing support approximately equal to the actual hub diameter. In other words, by inclining the blade spindles 6 and extending them through the whole body of the hub 2, the invention provides a maximum resistance to cocking stress in the long bearing thus afforded, and the distribution of the forces in this way makes it possible to avoid high or excessive loading at all points. Equalization of forces and stresses through these methods yields a new result apparent from the accompanying discussion and disclosures.

It will be noted that an endwise component of the resistance applied to faces P of the blades of Figure 6 is exerted on the blade and spindle, tending to lift the blade and spindle radially outward from the bore seats of the bearings. Otherwise stated, the thrust of the drive in forward pitch tends to loosen the seating of blade spindle 7 in tapered bearing relation with the hub bore 5, so that the rack-and-rod control for varying the pitch of the blades is not required to overcome any jamming force caused by endwise compression thrust on the blade spindles originating in pitch resistance. It is desirable to avoid beam deflection in the spindles by tapering them as shown, which expedient is coupled with the increased diameter hub shoulder section at the fore portion of the hub.

There is an additional force caused by the center of mass of the blade and attached spindle tending to move outward radially with increased rotation of the main shaft, added to the thrust component above discussed.

The resultant of these forces may be conceived of as being applied at the center of mass of the blade and spindle and at the instantaneous center of pressure of the blade, the centers not necessarily coinciding. If the resultant of these outward components has a rotating couple with respect to the blade spindle axis, there may be a varying force applied to the control mechanism which tends to shift the blade between various pitch positions, increasing generally with shaft speed and torque. The centrifugal and thrust forces in some designs may be of the same hand with respect to the axis of rotation of the blade spindle, so that both the blade spindle rocking forces are added. If the two forces be of respective opposite hand, they tend to nullify or cancel out, so that their net turning moment applied to the blade pitch control structure is relatively small.

This invention discloses the feature of relating the offset blade moment mass arm to the reactive thrust component arm so that their effects may be variously utilized for establishing a tendency for automatic pitch variation in accordance with the changes in centrifugal and thrust values; for cushioning automatically the rotary couple resulting from thrust on the blade with respect only to its turning moment about the blade spindle axis; and for setting up co-action with other features herein described for automatic, or self-varying pitch control. The present invention, however, is chiefly concerned with the structures by which these effects may be accomplished.

In examining the blade nearest the eye of the observer in Figure 6 which is the blade toward the left in Figure 7, it will be noted that the point G, assumed at the center of mass of the blade, has a spindle moment arm tending to rotate the blade toward zero pitch with increased centrifugal force. If the instantaneous center of pressure is located such that thrust reaction turning moment opposes centrifugal force as at H, there is a particular thrust component acting which, while trying to lift the blade perpendicularly out of the spindle bore, is at the same time producing an increment of rotational couple on the spindle.

This in an increment of the total reaction forces which tend to hold the blade and its stop 8 against the forward stop 9 when the engine is driving. This thrust component is derived from the "rake" of the median line and inclination of the blade spindles, and from the location of the instantaneous center of thrust on the face of the blade with respect to the spindle axis.

In studying the matter with respect to the instantaneous center of pressure of the blade, while it seems sufficient for present purposes to assume that a definite center of pressure exists, one should realize that in practice it is necessary to qualify the expression for the phenomena by using the word "instantaneous," since the "center" is actually an area which varies with the factor of helix angle and many other conditions, among them being the actual net water flow or the velocity of the media past the propeller blades. In practice, further, it has been found that simple mechanical diagrams to explain the relationships of forces on a fixed propeller blade, do not provide for accurate estimate of the true directions of the forces because of other factors, such as skin friction drag and the like.

Figure 5B:
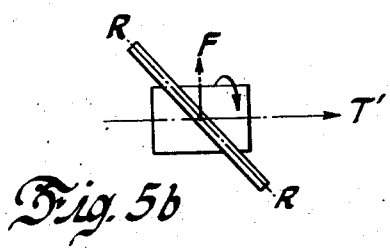

A further factor in these considerations is that a line representing force on a diagram is not actually the mirror image of the thrust reflected from the resistance, and does not represent 90 degrees less the angle of attack, for example. This would not be true even if the blades were simple paddles such as are indicated in the small diagrams of Figures 5b and 9a. When one is dealing with propeller blades of finite thickness and different degrees of curvatures of the working and suction faces, it is required that attention be given to the fact that the net directions of flow of the water pushed away from the face of the blades have a pattern of variations which not only changes with variation in pitch, but also changes with the relative speeds between the ideal speed that a theoretical propeller would impart to a vessel, and the actual speed imparted. It is therefore necessary to visualize a condition where the simple diagrams of Figures 5b and 9a are replaced by one in which the center of pressure on a blade is not only highly elusive, but also shifts about over the working face while simultaneously it is being subjected to resistance forces coming from the flow of the water or other media being exerted on it from a series of simultaneously varying angles.

For these reasons, the structure of the invention provides the designer of a change-pitch propeller with a wide range of facilities for adjusting the mechanical characteristics of blade contour, blade mass, blade face rake, spindle inclination angle, spindle rake, and standard or non-standard pitch to suit a particular set of working circumstances, at the same time preserving the fundamental standard requirements. Ship propellers of fixed pitch conform to general patterns according to limited ranges of torques and speed they are to be run at. One of the least understood problems in ship propeller design of the present day is the one of estimation of the torsional forces on a standard design of non-variable pitch propeller, tending to warp the blades from their accurate pitch. In high-speed propellers it occurs frequently that a resonant relationship caused by the modulus of elasticity, the net work arm of the blade and the speed of rotation, and the peripheral speed of the blade tips sets up a heavy vibration, causing extremely rapid erosion of the metal. With cavitation and skin-friction effects in which bubbles form, such high-speed propellers suffer deterioration and require frequent repair and replacement, due to water hammer. Attention is directed to the fact that in Figures 1, 3, 4, 5, 5a, 6, 8, 9, 13 and 14 the blade axis is shown inclined to the spindle axis. The term blade axis is sometimes used to designate the median line, which in different forms may be curved rather than straight.

The present invention provides for a wide range of flexibility in all of the formerly fixed characteristics outlined above, such as blade contour, mass, rake; spindle inclination and rake, and operating pitch. Specifically, when a propeller is required for a particular vessel such as a ship of given dimensions, tonnage, engine horsepower and speed range, and ship speed, the features outlined herein enable the designer to create a propeller structure which not only conforms to the particular specifications, but also allows the mechanism to be efficiently used under other conditions; such as increase in engine and vessel speed ranges, wide variations in displacement, and operation with distinctly different types of power plants, such as the dual electric and Diesel engine drive of a submersible vessel.

If necessary to apply a higher shaft speed to a fixed pitch propeller, the operator risks cavitation, rapid destruction of the blades, with reduced mechanical efficiency. The invention enables the operator to select a pitch conforming to the shaft speed requirements, avoiding damage and retaining efficiency.

Figure 14 describes the invention as installed in a ship. The sternpost framing extension or propeller strut 50 supports the overhanging propeller shaft 1 extending from the hull at the left, and also supporting the ship's rudder, not numbered.

The drawing of Figure 14 shows propeller shaft 1 which is connected to a ship's engine at the left, and bolted to hub 2. Blades 7, of which only one of three is shown, are mounted in bearing bore seats 5 by their spindles 6, as previously described in connection with Figures 6 to 10. Fairing 60 attached to hub 2 and shaft 1 provides a proper leading contour to the hub for the water stream.

The ship's sternpost frame 50 is extended in the conventional manner to support the bearing assembly 51 which carries stub shaft 1a bolted to the right-hand portion of hub 2. The sectioned portion 57 is a supporting sleeve secured to the framing at a convenient point.

Bore 4 of hub 2 is continuous with bore 4a of shaft section 1a, and shift rod 10 located therein terminates at the left in rack 12, and is equipped with collar 52 accommodating the fork 53 of bellcrank 54 pivoted to the framing at 55. Bellcrank 54 is pivoted to vertical rod 56.

Sleeve 19 surrounds the assembly of parts of the coupling arrangement joining rod 56 to control rod 20 through hollow threaded coupling member 20a and acts as an abutment at either end to limit the compression motion of spring 21, which seats above under collar 22 which in turn bears below against shoulder 23 of rod 56. A similar shoulder of rod 56 engages collar 24. Hub 2 has forward stop 9 and reverse stop 13 against which lugs 8 and 8a of blade 7 may rock at extreme pitch positions, such as are shown in detail in Figures 10 and 12.

The dashpot arrangement of Figure 15 is believed novel, in that it utilizes the fluid of the media in which the propeller operates in the case of the marine propeller, sea or river water. This avoids the awkward constructions which require sealed in fluid, with special means for avoiding contamination, and the placing of the dashpot within the spherical bearing, as shown, not only provides a convenient housing for the dashpot, but also avoids stress and bending loads which might tend to jam the piston 10a in the cylinder, if the dashpot were located at some other point in the hub and pitch shifter assembly.

Operation

When the force applied to the blades 7 tends to rock them to full driving position against the forward stop 9 or the reverse stop 13, the last increment of travel of the elements moving with change of pitch arranged by proper dimensioning of parts to cushion against the load of spring 21. If there be a sudden advance of engine throttle with acceleration applied to shaft 1 and hub 2, the force storage of spring 21 prevents slamming of the lugs 8 or 8a against either of stops 9 or 13 and relieves the shifter of sudden shock loads.

When the ship's engine throttle be retarded, the overtaking torque effect described above may tend to rotate the blades 7 so that the lugs 8 depart from forward stops 9 and move toward the zero pitch position of Figure 8. Each advancing and retarding of the throttle mechanism controlling the drive to shaft 1 therefore may have the effect of causing the propeller assembly to "freewheel," and at idling speeds places the blades in a minimum pitch position to be quickly reversed, should the control of rod 10 be desired to shift the blades 7 to negative pitch position thereafter.

Now if the operator attempt to shift the rod 10 and rack 12 to rock the blades 7 and the segments 11 to reverse pitch, that is, to positions where the helix angle of the blades is that of a right-hand screw as in Figure 9, the residual drag of the water on the blades may quickly rock them toward idling position, therefore very little force is required to rock the blades further to full negative pitch in abutment with the reverse stops 13 of Figure 10.

Subsequent opening of the engine throttle or throttles may then apply force components to rock the blades 7 so that the lugs 8 are held in abutment with reverse stops 13 as long as positive torque is applied to the shaft 1, by the same principles and relationships which kept the blades 7 at their efficient forward pitch angles, described preceding.

Drive in reverse may then proceed indefinitely, and if these characteristics are emphasized in the design, each opening of the throttle rocking the blades to their full permitted limit of negative helix angle; and reduction of the throttle to idling commensurately causing the blades to rock back toward zero pitch or idling positions.

As in forward drive, the external control for rod 10 may be arranged to stop the reverse drag effect on the blades at zero pitch, in order to permit the same degree of throttle maneuvering of the blade pitch in reverse that is afforded in forward drive.

As will be described further, a ship often must be maneuvered in such close quarters that a useful degree of propeller engine braking be made available. If the self-adjusting propeller form is used, it may freewheel so that little or no braking can be had. It is therefore useful to be able to hold and lock the controls for the blades in either maximum forward or reverse driving pitch position, in opposition to any reaction torque effect. For this purpose the control diagram of Figure 16 is utilized. With this arrangement of elements, the rack rod 10 is locked against axial yielding, the forked stop 30 intersecting the collar slot 29 of rod 10 when operator control lever 35 is moved from position $S^1$ to position $S^2$. Likewise, with the same engine and propeller braking effect desired in reverse drive, the stop 30 intersects the collar slot 31 of rod 10, preventing reactive torque from rocking the blades from maximum negative angle position in reverse, as when the engine is decelerated by idling the throttle. The slot 36 is for locking the blades in zero pitch positions, as is obvious from the construction. Fixed stops 40 and 41 block stops 31a and 29 at the extremes of motion.

Rod 10 is, of course, further controlled for position by servo and manual means, conditioned by spring 21 such as shown in Figure 14 described preceding.

Figure 16 is schematic, showing merely the principle of locking in the controls, the Roman numerals I and II indicating the forward and reverse locking stop positions, and III indicating neutral lock. Pawl 34 of lever 35 in notch S¹ locks the fork stop 30 in non-active position, and in notch S², holds the lever 35, rod 33, bellcrank 32 and fork 30 in active position in either one of collar slots 29 or 31, or in the neutral slot 36.

In Figure 15, the method of controlling the rate of change of the blade pitch of the construction of Figure 14 consists of a piston concentric with rod 10, mounted in cylindrical sleeve 1b, affixed to hub 2, the vent holes 10c and 10d serving to limit the time period of exhaust and of filling of the water trap spaces at either end of the cylinder 1b. The spherical bearing 51 performs the same function as in Figure 14, that of permitting deflection of the shaft and strut without binding. Rod 10 is manipulated between forward and reverse pitch positions by rocking of the external connections to fork 53, which reciprocates collar 52 and rod 10. This dashpot control of rate of pitch shift may be used directly with the construction of Figure 14, or with other forms of external control. Due to the dimensions of the orifices 10c and 10d, the mechanism is prevented from abrupt shifting to or from full pitch positions. When moving toward the left hand position, with the piston having traveled far enough to seal the orifices 10c, the water trapped behind the piston 10a can only leak out very slowly through the space between the bore 4 of hub 2 and the rod 10. This serves to give a cushioned stop effect, upon shifting to the reverse pitch position of Figure 9.

When shifting to forward pitch, the rate of motion of piston 10a is controlled by the orifice dimensions at 10d. It eventually abuts the end wall of cylinder 1b, simultaneously with the abutment of forward stops 8 of the blades of Figure 12 against hub stops 9 of Figure 10. If desired, the orifices 10d may be made radial in an extension of cylinder 1b to the right, so as to provide an identical water trap cushion effect for the shift to forward pitch. Further orifice action may be utilized such as indicated by the passage 10e in dashed lines, connecting the cylinder spaces on either side of piston 10a through the body of the piston. While the latter may be used alone without the expedient of the orifices 10c and 10d, it is deemed advisable for the mechanism to be self-cleaning, which latter effect is rendered more positive by complete change of water in the cylinder 1b at every full cycle of operation.

In the case of the self-adjusting pitch propeller, the dashpot serves to prevent fluttering or rapid oscillations of the blades and shift mechanism, yet without restricting the external control operations.

The small schematic drawing of Figure 17 shows control fork 30 operated from a mechanism such as in Figure 16, and arranged to intersect stop collar 36a of rod 10 and rack 12. The longitudinal spacing of the collar 36a with respect to the fixed longitudinal position of fork 30 is such that the blades of the arrangement of Figures 6 to 12, for example, are always at a forward pitch angle when the collar 36a is to the right of the stop fork 30, and always at a negative pitch angle when the collar 36a lies to the left of the fork 30. This mechanism is adapted to permit the use of a self-actuating blade which rotates on its spindle between maximum and minimum forward or reverse pitch, but prevented from going through neutral pitch until the operator remove the fork 30 from the path of motion of rod 10 and collar 36a.

With this control, the operator may set rod 10 at any desired pitch angle, either in forward or reverse, by means of the external control of Figure 14, for example, but to shift through neutral pitch from forward to reverse, or from reverse to forward, it is necessary to lift fork 30 by the auxiliary control of Figure 16, or by a similar contrivance.

This is distinct from the Figure 16 stop arrangement, which is a purely "lock-in" type of control, for positive operating of the propeller in fixed pitch, in circumstances wherein it is desired to eliminate self-actuation in varying pitch of the blades. The Figure 17 device serves the distinct purpose of prevention of shift through neutral, while permitting variable pitch operation in definite forward or reverse pitch.

Upon reflection, it will be understood that with a self-adjusting propeller, sudden reversal of the drive by shifting rod 10 may be blocked by the resultant forces in the system, so that abuse of the device is inherently safeguarded against. For example, if the operator attempts to shift the blades to reverse or to a negative pitch angle position while the engine throttle control is open, the blade torque forces may resist motion of rod 10, so that the reaction components will hold lugs 8 against stops 9, shown in Figure 10.

However, with the engine throttles being closed, the drag forces of the water slipstream may be immediately made active to shift the offset blades toward their null or idling points, in timed proportion to the deceleration rate of shaft 1 and the connected power plant; whereupon the force to shift rod 10 to reverse need only overcome the mechanical frictions and the residual drag of the propeller in the water.

The same effects may be present with drive in reverse, when the operator may attempt to shift rod 10 suddenly to forward position. In each case it is necessary to reduce the speed of shaft 1 by reduction of the power plant throttle control, to idling, so that the torque reaction forces are low enough to be overcome by the force applicable to rod 10 by the external control means. This does not mean that the operator is kept from shifting from reverse to forward or vice versa while the ship may have way. It must be remembered that the force of way on the ship may be utilized to bring the blades back to their null positions.

It should be understood herewith that the exact details of the structure of the blades and the arrangement of their shafts for obtaining the self-actuating action described above is not the subject matter of the present invention, but is reserved for a subsequent application. The present specification has to do with the structure of hub, blade mounting and controls whereby various forms including self-feathering blades may be utilized.

It should be noted that the rack teeth of the triangular rack 12 in Figure 10 are shown inclined to a plane normal to the axis, and that the segmental teeth 11 of each blade shaft 6 are at right angles to the spindle axis, in order to provide a predetermined angular motion of the shafts for a given longitudinal movement of the rack 12 and rod 10. It will be seen that the selected angularities of the rack and segment tend to diminish the undesirable fluctuations of force in the control system, because of the mechanical advantage relationship between blade 7 and shaft 10. It is within the purview of the invention to incline the teeth 11 of the blade spindles 6, as shown in Figure 5a, in conjunction with inclined teeth of rack 12, as shown in Figure 10, to obtain reactive force effects in conjunction with special forms of controls. Attention is directed to the mechanical advantage of rack teeth 12 over the teeth 11 of spindle 6 of Figure 12, which assures a leverage favoring the external control system, tending to nullify reactive force from the blade system from being exerted on the external controls.

Having thus described by invention, what I claim is:

1. In marine propellers, a power shaft, a controllable pitch propeller, comprising a one-piece hub flanged to said shaft and contoured externally for axial motion through a fluid medium at optimum slipstream efficiency, a central axial bore in said hub, a plurality of elongated inclined bores symmetrically displaced in said hub and intersecting said central bore, with the bore centerlines offset from that of said central bore, the said inclined bores extending through the body of said hub, a plurality of blades with their blade spindles located within said bores for rotational motion about the inclined centerlines thereof and supported against varying centrifugal and thrust forces in said bores, said blades being formed with mass centers and thrust areas having moment arms about the spindle axes of opposite rotational coupling values with respect to said axes and operative to tend to cancel said forces over a predetermined operative pitch range of said blades and control means located in said central axial bore and adapted to move said blades synchronously through controlled pitch angles by connections with said blades extending through the intersections of said inclined bores with said central axial bore, said control means being effective to shift between forward and reverse pitch against an uncancelled component of said forces, while under load on said power shaft.

2. In controllable pitch propellers, a shaft, a hub assembly for said shaft comprising, a one-piece hub attached to said shaft, a rack member, a plurality of blades adapted to be mounted in said hub for limited pivotal rotation between forward and reverse pitch positions, a central bore in said hub providing longitudinal bearing for axial motion of said rack therein, shifting means for moving said rack axially in said bore, a plurality of symmetrically inclined bores intersecting said central bore and extending through the body of said hub, said inclined bores having centerlines offset from that of said central bore, spindles for said blades having outwardly tapered bearings in said inclined bores and loaded in accordance with opposing thrust and centrifugal forces created in said blades by rotation of said shaft and said hub, supporting means for retaining said spindles in said inclined bores against said forces and distribute same to the body of the hub, and coordinating and actuating means connecting the said spindles to said rack through intersections of said inclined and central bores for equiangular rotation of said spindles, said shifting means, said supporting means and said coordinating means providing shift of pitch during shaft rotation against an active positive or negative component of said forces.

3. In propellers for vehicles, in combination, a driving shaft subject to acceleration and deceleration, a controllable pitch propeller comprising a unitary hub body secured to said shaft, a central bore in said shaft, bearing bores extending through the body of said hub inclined in one rotational direction with respect to the axis of said shaft and intersecting said central bore, the centerlines of said bearing bores being offset from that of said central bore, blade spindles supported wholly within said inclined bores and having integral bearing surfaces formed thereon capable of supporting thrust and centrifugal forces and transmitting such forces to the body of said hub, means supporting said spindles in said bores against the action of said forces, one of said means consisting of a tapered bearing for absorbing compressional force, a control device for coordinating the motions of said blades supported in said central bore, and blade body portions integral with each of said spindles subject to varying thrust and centrifugal forces under acceleration and deceleration of said shaft and with rotation of said portions in a fluid medium, the working faces of said blade portions being unbalanced and offset with respect to the inclined spindle axes, while the blade mass centers are oppositely offset to the working faces so that the thrust force on said faces tends to oppose the effect of centrifugal blade force upon pitch shift.

4. A controllable pitch propeller comprising a hub equipped with blades adjustable to vary their pitch, said blades being formed with effective offset thrust areas and oppositely offset mass centers such that the moment arm of their thrust couple is opposed to the moment arm of their mass, spindles for said blades with axes inclined to the blade working faces, and about which the said moment arms are developed, said hub having symmetrically disposed elongated bearing orifices therein, the axis of each orifice passing the hub axis obliquely at one side thereof, root spindles for said blades seated within said orifices, and pitch shifting means connected to said root spindles operative to provide pitch settings by force application of a magnitude always in excess of the maximum differential between said thrust and mass couples of said blades developed about said spindle axes.

5. A controllable pitch propeller comprising a hub having symmetrically disposed elongated tapered bearing orifices, the axis of each passing the hub axis obliquely at one side thereof, blades for said hub, each blade being formed with a thrust area and a mass center oppositely displaced with respect to the centerlines of said orifices for the purpose of generating opposing thrust and centrifugal force moment arms about said centerlines, root spindles for said blades from which the blade faces project at oblique angles, said spindles being tapered and occupying said orifices for their full length, means for retaining said spindles in said orifices and supporting the loading thereon, and means to shift said blades through rotation of said spindles between forward and reverse pitch settings thereof, said latter means furnishing a shift force capable of overcoming the existing differential moment of force between said thrust and said centrifugal force moments and the loading by said first named means.

6. Means as defined in claim 5 in which the tapered bearing orifices extend through said hub and are provided on their ends remote from the blades with bearing retaining means engaging the hub to restrain axial movement of the tapered spindles, while permitting pitch rotation thereof.

7. Controllable propeller pitch propulsion mechanism for marine vessels comprising a propeller shaft, a hub affixed to the shaft, said hub having symmetrically disposed elongated bearing orifices with axes located obliquely with respect to the hub axis, and blades having root spindles seated within said orifices with retaining means holding the spindles within the orifices, the working faces of said blades being inclined to the spindles at oblique angles and with unbalanced thrust areas and mass centers offset with respect to the spindle center lines, with each blade having a net moment arm of two components, one component being a varying thrust force derived from said unbalanced thrust areas and the other a varying speed force derived from shaft rotation and the blade center of mass applied rotationally about the centerline of the said root spindle, the inclinations of said orifices and said working faces being operative to provide an effect of thrust and centrifugal force on said blades tending to unload said bearings when the propeller is operating normally, and means to shift said blades between forward and reverse pitch against residual beam loads on said spindles and against the varying thrust and centrifugal moments of rotation about said root spindles.

8. Controllable pitch propeller mechanism for operation in fluid media comprising a propeller shaft, a propeller attached to the shaft comprising a hub having blades and blade spindles adjustable during rotation to vary their pitch, each of said blades having an unbalanced thrust area for generating a rotational couple about its spindle center and a blade mass center located at a moment arm distance from the said spindle center and displaced so as to generate an opposing rotational couple to that of the thrust area, said hub having elongated bearing orifices located obliquely and arranged symmetrically with respect to the hub axis, bearing seats for said spindles within said orifices, control means operative to rock said spindles between forward and reverse positions, working faces for said blades having a fixed inclination with respect to the extended centerlines of said spindles, and subject to varying and unequal thrust couples tending to diminish pitch variably with changes of pitch in both forward and reverse pitch settings while subject to the said opposing force couples of said thrust areas and mass centers, the combination being effective to create a low differential force upon said control means, and each of said orifices being located so as to extend from their entrance ends at the blade roots toward the direction of the force exerted upon the fluid medium in the normal forward operation of the propeller.

9. A controllable pitch propeller embodying a power shaft, a one-piece hub on said shaft having a central axial bearing bore, a plurality of offset and outwardly tapered bearing bores extending through the body of said hub and intersecting said axial bore, said offset bores being symmetrically inclined to the hub axis, a plurality of blades with spindles extending through said bores and simultaneously shiftable to vary their pitch, each of said blades being formed with an unbalanced thrust area generating an opposing rotational couple to that generated by the mass of the blade about the spindle centers, bearings formed in said offset bores adapted to support compressional forces derived from thrust and caused by the resistance of the media in which the blades are immersed, bearing means securing each of said spindles located at the opposite end from the blade thereof and arranged to hold the spindles rotatably in said offset bores against tensional and centrifugal force applied to said spindles, and a blade control device supported for sliding within said axial bearing bore and effective to shift said blades simultaneously through positive and negative pitch angles against the differential of said forces and rotational couples upon said blades, said bearings and securing means.

10. A controllable pitch propeller drive embodying a power shaft, an ogival unitary hub fixed to said shaft, a plurality of rockable propeller blades adapted to rotate with said hub, each blade having a spindle with fixed angular relationship to its working face with its working face comprising an unbalanced thrust area, offset spindle bores in said hub extending through the body thereof and symmetrically inclined to the hub axis, bearing surfaces formed on said spindles and in said bores supporting the centrifugal and thrust forces on said spindles resulting from rotation of said shaft and the resistance of the blades to the working media, a central bore in the body of said hub concentric with the axis thereof and intersecting each of the said offset blade spindle bores, a blade control device supported for sliding bearing motion in said central bore and adapted to move each of said spindles simultaneously at equal pitch angles between forward and reverse pitch positions, and cooperating angularly related teeth formed on the surface of each of said spindles and said device effective to provide equal angular motion of each blade for a predetermined forward or reverse axial motion of said device.

11. A controllable pitch propeller drive embodying a power shaft and a unitary hub concentric therewith, and a set of movable blades adapted to rock through equivalent pitch angles, rockable spindles for said blades, each inclined to the axis of its blade, offset bearing bores extending through the body of said hub symmetrically inclined to the hub axis and effective to support said spindles against compression and tension forces exerted by said blades and against torsional forces created by rotation of said shaft and resistance of the media in which the propeller drive operates, said offset bores having a tapered bearing fit with cooperating portions of said rockable spindles, a central axial bore in said hub intersecting said offset bores, pitch changing means effective to rotate and to limit the rotation of said spindles between predetermined positive and negative pitch angles for said blades, said means being located in and supported by the adjacent portions of said axial bore for sliding bearing motion therein, and motion coordinating teeth joining each of said spindles and said pitch changing means arranged to provide equal rotation of said spindles for a predetermined motion of said means and having a mechanical advantage favoring the movement of said pitch changing means.

12. A controllable pitch propeller drive mechanism embodying a shaft attached to a unitary hub in which are mounted a plurality of swiveling blades, a construction of blade and spindle wherein the median line of the blade face is placed at a fixed angle with the centerline of the spindle, bearing surfaces formed on each spindle, a segment of teeth formed on the surface of each spindle, inclined bores extending through said hub for mounting and supporting said spindles for full bearing between the end limits of said bores and forming bearing surfaces mating with the said spindle bearing surfaces, a central axial bore in said hub intersecting said inclined bores, and an axially shiftable toothed member located in a hollow portion of said shaft and having bearing relationship with said axial bore, adapted to shift and to hold all of said blades at a common pitch angle, the teeth of said member being constantly meshed with the toothed segments of each of said blade spindles, and a formation of said blades with thrust areas offset from the spindle axes and oppositely disposed from the blade mass centers also offset from said axes, the arrangement being operative to generate a thrust couple tending to rotate the blade and spindle in one direction opposing a centrifugal thrust couple tending to rotate it in the opposite direction, and said blade formation and the said angles of inclination resulting in a mutual cancellation of portions of said forces such that said toothed member is effective to change the pitch of said blades by force of lesser value than either of the thrust or centrifugal force values.

13. In controllable pitch propeller mechanisms, in combination, a power shaft, a unitary hub affixed to said shaft, three movable blades adapted to be mounted in and supported by said hub and arranged to shift synchronously between positive and negative pitch positions, each of said blades having a spindle the axis of which is set at an angle from the median line of the blade and offset from the blade face, and each having means to rock said spindles through predetermined pitch angles, inclined bores extending through the body of said hub and through which the said spindles extend, said bores forming bearing for the spindle extensions of said blades, a central bore in said hub, and a control member fitted with sliding bearing in said central bore and extending through a hollow portion of said shaft for sliding motion arranged to shift said blades synchronously to forward, reverse or neutral pitch positions by connection through said spindle rocking means.

14. In controllable pitch marine propellers, in combination, a power shaft, a unitary propeller hub attached to rotate with said shaft, a plurality of propeller blades mounted in said hub, having spindle axes offset from and at an angle to the working faces, inclined offset bearing bores formed in and extending through the body of said hub, a blade having a working face with a thrust area in which the thrust area is unbalanced and offset with respect to the spindle axis and with the blade mass center oppositely disposed in order to oppose the effect of centrifugal force on the blade mass tending to change the blade pitch, the spindles for each of said blades extending through and seated in said bearing bores and adapted to rotate therein between variable forward and reverse pitch positions, said bearing relation affording support of the thrust and centrifugal forces of said blades in the body of said hub, the said forces tending to cancel each other by the said inclination of bore axis and working face, end bearings for said spindles in said bores, spindle turning means for each blade located between said end a central bore intersecting the said bearing bores between the said end bearings, and a blade pitch coordinating control member supported in said central bore for axial motion in both forward and reverse pitch setting positions, and engaging the said spindle turning means by connection through the intersection of said central bore with said inclined bearing bores, said member being operative to reset forward or reverse pitch against the differential of said opposing forces.

15. In controllable pitch propeller, the combination of a shaft, a single-piece hub attached for unitary motion to said shaft, a central axial bore in said hub, offset blade spindle bores in said hub inclined to said axial bore and each intersecting it through apertures located between bore end positions, a plurality of rotatable blades each having a spindle the axis of which is at an angle with the longitudinal axis of its blade face, and having a thrust area disposed oppositely to the center of mass with respect to the spindle axis for generating opposing thrust and centrifugal force varying with speed and pitch, and each blade having a spindle turning means located between end bearing positions, bearings for said spindles in said bores adapted to be unloaded by said forces during propeller rotation, a blade pitch shifter and coordinating device supported for sliding motion within hollow portion of said shaft and in said central bore for cooperating and connecting with said means, said device being operative to shift between forward and reverse pitch against differential forces derived from said thrust and centrifugal force of said blades expressed as turning moment on said spindles and as load upon said spindle bearings.

16. A controllable pitch propeller embodying in combination, a driving shaft, a one-piece rotative hub affixed thereto, a pitch shift control mechanism, inclined bearing bores extending through said hub, a plurality of blades adapted to rock through variable forward and reverse pitch angles, each blade having a spindle offset and at an angle with the median line of its working face and with the thrust area disposed to the center of mass such that opposing rotative couples are generated about the spindle center when the hub and blades are rotated under load, said spindles extending through and supported in said bearing bores and bearing surfaces formed on each blade spindle coacting with the bearing surfaces of said bores, and an inclination of said bores to the axis of said shaft effective to utilize the resultant of thrust and centrifugal force on said blades for unloading said bearings when said propeller is driving, this result permitting pitch selection operation of said mechanism by forces of lesser magnitude than the said thrust on said blades or the said centrifugal force.

17. A composite propeller drive comprising a driving hub of one-piece construction, variable pitch blades with spindles mounted for reciprocation in symmetrically inclined offset bearing bores extending through the body of said hub end bearings in each of said bores to accommodate said spindles, working faces on said blades having thrust areas which generate a thrust force, a disposition of the mass of the said blades with respect to said thrust areas providing a rotative couple opposing said force about the axes of said spindles, the spindle having fixed angles with the blade working faces and fitted to said bores and to said bearings each with a toothed segment located between said end bearings in said bores, a central axial bearing bore in said hub intersecting each of said inclined bearing bores, and a reciprocable control device supported for axial motion in said central bore and having teeth constantly meshed with said segments at a mechanical advantage favoring the motion of said device and movable to shift said blades between forward and reverse pitch positions, the said device being shiftable during the rotation of said hub and blades against the differential of said thrust on said blades and the rotative couple generated by their mass.

18. In controllable pitch propeller mechanism, in combination, a single-piece propeller hub contoured for streamline efficiency in the slipstream of a fluid medium, three symmetrically inclined, offset bearing bores passing through the body of said hub each bore having a larger diameter portion intersecting the external surface of said hub at the advancing portion of the hub with respect to the normal flow of said medium, blades with spindles rockable in said bores and joined to said spindles at the said larger diameter portion of said bores, working faces on said blades having offset thrust areas with moment arms normally opposing the effect of blade mass couples about the axes of said spindles, segments with teeth formed on each of said spindles, a central axial bearing bore in said hub intersecting said inclined bores, and a control device supported for axial motion in said central bore providing reactive positioning of said blades against the differential of said couples and including rack teeth projecting through said bore intersections and meshing with said segment teeth to rotate said blades through simultaneous forward and reverse pitch angles, said segment teeth and said rack teeth having inclined and straight tooth meshing commensurate with the inclination of said inclined bores to the said central bore.

19. A controllable pitch propeller comprising a shaft and a hub mounted to rotate therewith equipped with blades adjustable between forward and reverse pitch by shiftable means external to said hub, elongated bearing orifices in said hub disposed symmetrically with respect to the hub axis and crossing the hub at an oblique angle to the said axis and offset to one side thereof, each of said blades having a root spindle inclined to the median line of its blade and supported by and seated wholly within one of said obliquely disposed orifices, a working face for each blade with a thrust center effective to generate an unbalanced thrust couple about the axis of its spindle, and an arrangement of the mass of the blade formed to provide an opposing couple such that the effect of centrifugal force of rotation of the shaft tends to oppose the thrust force upon the blade within a predetermined pitch range of said blades, the opposition of said coupling forces thereby diminishing the net force required to be exerted by said external pitch adjusting means to effect changes in pitch when the propeller is rotating.

20. In a controllable, reversible pitch propeller, a propeller shaft, a propeller hub attached to said shaft having symmetrically inclined spindle bores offset from the hub axis, the spindle bores being of larger diameter in the direction of normal forward motion, blades and blade spindles with larger blade root sections than the remote spindle ends, said spindles being recessed in said inclined bores, and retaining end bearings at the remote spindle ends, whereby normal blade thrust is transmitted directly to the peripheral sections of the hub adjacent the larger diameter bore sections and whereby centrifugal force upon the blades and spindles is supported tensionally in said spindles and is absorbed in said hub by compression.

21. In a propeller hub mechanism the combination of a rotatable hub having tapered spindle bores for swiveling blades, the said bores being inclined symmetrically and rotationally about the hub axis with their larger diameter portions all lying at one axial end of the hub and their smaller diameter portions lying at the opposite axial end of the hub, the small portion centers all intersecting one plane at right angles to the hub axis and the larger portion centers intersecting a parallel plane to the first plane, and when taken in rotational succession, one bore to the next, the large bore end center of each lies in a line parallel to the hub axis which intersects the bore center of the next at the smaller end portion.

EDWARD V. RIPPINGILLE.